United States Patent
Liu et al.

(10) Patent No.: US 6,984,422 B2
(45) Date of Patent: *Jan. 10, 2006

(54) PHOTO PROCESS TO IMPROVE TRIBOLOGICAL PERFORMANCE OF THIN LUBRICANT FILM

(75) Inventors: Jianwei Liu, Fremont, CA (US); Michael Joseph Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/428,808

(22) Filed: Apr. 30, 2003

(65) Prior Publication Data

US 2003/0215674 A1 Nov. 20, 2003

Related U.S. Application Data

(60) Provisional application No. 60/380,770, filed on May 14, 2002.

(51) Int. Cl.
*G11B 5/84* (2006.01)

(52) U.S. Cl. ............... 427/558; 427/553; 427/130; 427/131

(58) Field of Classification Search ............... 427/558, 427/553, 130, 131
See application file for complete search history.

(56) References Cited

U.S. PATENT DOCUMENTS

| | | | |
|---|---|---|---|
| 5,030,478 A | 7/1991 | Lin et al. | |
| 5,273,830 A | 12/1993 | Yaguchi et al. | |
| 6,096,385 A | 8/2000 | Yong et al. | |
| 6,099,762 A | 8/2000 | Lewis | |
| 6,541,431 B1 | 4/2003 | Akada et al. | |
| 6,608,009 B2 | 8/2003 | Akada et al. | |
| 6,686,019 B1 * | 2/2004 | Liu et al. ............... | 428/65.8 |
| 2002/0006531 A1 | 1/2002 | Tani et al. | |

* cited by examiner

*Primary Examiner*—Stevan A. Resan

(57) ABSTRACT

A system and method for improving the durability and reliability of recording media used in hard drives is disclosed. A protective overcoat made of diamond like carbon (DLC) is first deposited over a magnetic layer. A lubricant layer, typically containing Moresco lubricant or a perfluoropolyether (PFPE), is then deposited over the protective overcoat. Finally, the lubricant layer is exposed to ultraviolet (UV) light for a period of time.

7 Claims, 7 Drawing Sheets

PHOTO PROCESS TO IMPROVE TRIBOLOGICAL PERFORMANCE OF THIN LUBRICANT FILM

This application claims priority from U.S. provisional application Ser. No. 60/380,770 filed on May 14, 2002.

BACKGROUND OF THE INVENTION

1. Field of the Invention

The present invention relates generally to the field of disc drive storage, and more particularly to lubricants used in disc drives to improve tribological properties.

2. Description of the Related Art

Computer disc drives commonly use components made out of thin films to store information. Both the read-write element and the magnetic storage media of disc drives are typically made from thin films.

FIG. 1A is an illustration showing the layers of a conventional magnetic media structure including a substrate 105, a seed layer 109, a magnetic layer 113, a diamond like carbon (DLC) protective layer 117, and a lube layer 121. The initial layer of the media structure is the substrate 105, which is typically made of nickel-phosphorous plated aluminum or glass that has been textured. The seed layer 109, typically made of chromium, is a thin film that is deposited onto the substrate 105 creating an interface of intermixed substrate 105 layer molecules and seed layer 109 molecules between the two. The magnetic layer 113, typically made of a magnetic alloy containing cobalt (Co), platinum (Pt) and chromium (Cr), is a thin film deposited on top of the seed layer 109 creating a second interface of intermixed seed layer 109 molecules and magnetic layer 113 molecules between the two. The DLC protective layer 117, typically made of carbon and hydrogen, is a thin film that is deposited on top of the magnetic layer 113 creating a third interface of intermixed magnetic layer 113 molecules and DLC protective layer 117 molecules between the two. Finally the lube layer 121, which is a lubricant typically made of a polymer containing carbon (C) and fluorine (F) and oxygen (O), is deposited on top of the DLC protective layer 117 creating a fourth interface of intermixed DLC protective layer 117 molecules and lube layer 121 molecules.

The durability and reliability of recording media is achieved primarily by the application of the DLC protective layer 117 and the lube layer 121. The DLC protective layer 117 is typically an amorphous film called diamond like carbon (DLC), which contains carbon and hydrogen and exhibits properties between those of graphite and diamond. Thin layers of DLC are deposited on disks using conventional thin film deposition techniques such as ion beam deposition (IBD), plasma enhanced chemical vapor deposition (PECVD), magnetron sputtering, radio frequency sputtering or chemical vapor deposition (CVD). During the deposition process, adjusting sputtering gas mixtures of argon and hydrogen varies the concentrations of hydrogen found in the DLC. Since typical thicknesses of DLC protective layer 117, are less than 100 Angstroms, lube layer 121 is deposited on top of the DLC protective layer 117, for added protection, lubrication and enhanced disk drive reliability. Lube layer 121 further reduces wear of the disc due to contact with the magnetic head assembly.

FIG. 1B shows the chemical composition of Moresco lubricant developed by Matsumura Oil Research Company, Inc, which can be used as a lube layer 121. Although Moresco lubricants are conventional lubricants used to lubricate disks in hard drive applications, there are both advantages and disadvantages with using these lubricants as will discussed below.

Other typical lubricants that can be used as lube layer 121 include Perfluoropolyethers (PFPEs), which are long chain polymers composed of repeat units of small perfluorinated aliphatic oxides such as perfluoroethylene oxide or perfluoropropylene oxide. As is well known in the art, Moresco lubricant as well as PFPEs are used as lubricants because they provide excellent lubricity, wide liquid-phase temperature range, low vapor pressure, small temperature dependency of viscosity, high thermal stability, and low chemical reactivity. These lubricants also exhibit low surface tension, resistance to oxidation at high temperature, low toxicity, and moderately high solubility for oxygen. Several different PFPE polymers are available commercially, such as Fomblin Z (random copolymer of $CF_2CF_2O$ and $CF_2O$ units) and Y (random copolymer of $CF(CF_3)CF_2O$ and $CF_2O$) including Z-DOL and AM 2001 from Montedison, Demnum (a homopolymer of $CF_2CF_2CF_2O$) from Daikin, and Krytox (homopolymer of $CF(CF_3)CF_2O$).

FIG. 1C is a flow chart showing the typical steps used in an in-situ vapor lubrication process that deposits PFPE lubricant over a carbon layer. The process begins with step 150 by transferring a partially complete media with substrate 105, seed layer 109, and magnetic layer 113 into a vacuum chamber. The transferring process typically involves moving a disk, after depositing a magnetic layer on it, into a carbon deposition chamber without taking it out of vacuum. In step 155 a protective layer 117 consisting of an amorphous carbon is deposited over the partially complete media. Typically the amorphous carbon layer is diamond like carbon (DLC) that has been deposited by conventional sputter deposition techniques. Next in step 160, the amorphous carbon is coated with a lube layer 121 made of Moresco lubricant or PFPE using a dipping process or an in-situ vapor lubrication process. Finally, in step 165 the lubed magnetic media is transferred to the next manufacturing operation.

In step 160, the lube layer 121 can be applied using several processes including dipping the magnetic media, which has a protective layer 117, into a tank of lubricant fluid or vapor lubing the disk. If the lube layer 121 is applied with a dipping process, the magnetic media with protective layer 117 is first taken out of vacuum and dipped into a tank of lubricant fluid. If lube layer 121 is applied using a vapor luber, then step 160 can be done in the same or different apparatus as step 155 was done.

In the dipping process, lube layer 121 is typically applied evenly over the disc, as a thin film, by dipping the discs in a bath containing a mixture of a few percent of the lubricant in a solvent and gradually draining the mixture from the bath at a controlled rate. The solvent remaining on the disc evaporates and leaves behind a layer of lubricant less than 100 Angstroms. Recent advances have enabled the application of PFPE using an in-situ vapor deposition process that includes heating the PFPE with a heater in a vacuum lube process chamber. In this system, evaporation occurs in vacuum onto freshly deposited DLC protective layer 117 that has not been exposed to atmosphere, creating a thin uniform coating of PFPE lube layer 121.

There are however, problems with using Moresco and PFPE lubricants in media for modern disc drives applications. For example, as the thickness of the protective layers 117 and lube layers 121 are reduced, reliability problems arise. A more integrated protection structure is needed that will produce a more durable protective film without effecting thicknesses. Reliability of hard disks is heavily depended upon the durability of the thin film media.

Lubrication additives, such as Bis(4-fluorophenoxy)-tetrakis (3-trifluoromethyl phenoxy) cyclotriphosphazene (X1P), have been used to improve tribological performance and corrosion resistance of thin film media. However, problems like phase separation, head smear, etc. have greatly hindered such applications. Although, various attempts to solve these problems have been made including using the Moresco lubricants developed by Matsumura Oil Research Company, Inc. which is linked directly to cyclotriphosphazene, satisfactory results have not been achieved. New lubricants such as the Moresco lubricants give better contact-stop-start testing results under harsh conditions than do the other lubricants. Although these new lubricants are an improvement over old lubricants, there are still many problems such as lubricant pick-up, head smear and high stiction which prohibit the use of hybrid lubricants.

Therefore what is needed is a system and method which overcomes these problems and makes it possible to hybrid lubricants process that results in a reliable final overcoat with desirable properties. Desirable properties include a resulting lubricant that do not have problems such as phase separation, lubricant pick-up, head smear, high stiction, etc.

SUMMARY OF THE INVENTION

This limitation is overcome by treating a hybrid lubricant film, containing both perfluoropolyether (PFPE) moiety and cyclotriphosphazene moiety, with ultraviolet light (UV). The UV treatment enhances the lubricant bonding on carbon overcoat, reduces lubricant pickup and head smear, and improves fly stiction and CSS durability of thin film storage media. The hybrid lubricant has weak bonding on carbon overcoat because of the lower hydroxyl end-group content. When lubricant film is in contact or near-contact with flying heads, lubricant molecules are more likely to be picked up. The UV process enhances the bonding of the hybrid lubricant on carbon overcoat. The stronger bonding reduces lubricant pick-up and head smear.

UV treatment reduces fly stiction of the hybrid lubricant, from 12.6 g to 7.8 g after 30 sec of exposure. CSS durability at harsh environmental conditions is also improved significantly after disks are exposed to UV.

These and various other features as well as advantages which characterize the present invention will be apparent upon reading of the following detailed description and review of the associated drawings.

BRIEF DESCRIPTION OF THE INVENTION

DETAILED DESCRIPTION OF THE PREFERRED EMBODIMENTS

The invention provides a system and method for protecting magnetic media. The invention is directed to a method of treating a lubricant that has been deposited over a magnetic media structure with ultraviolet (UV) light.

Figure 1A:
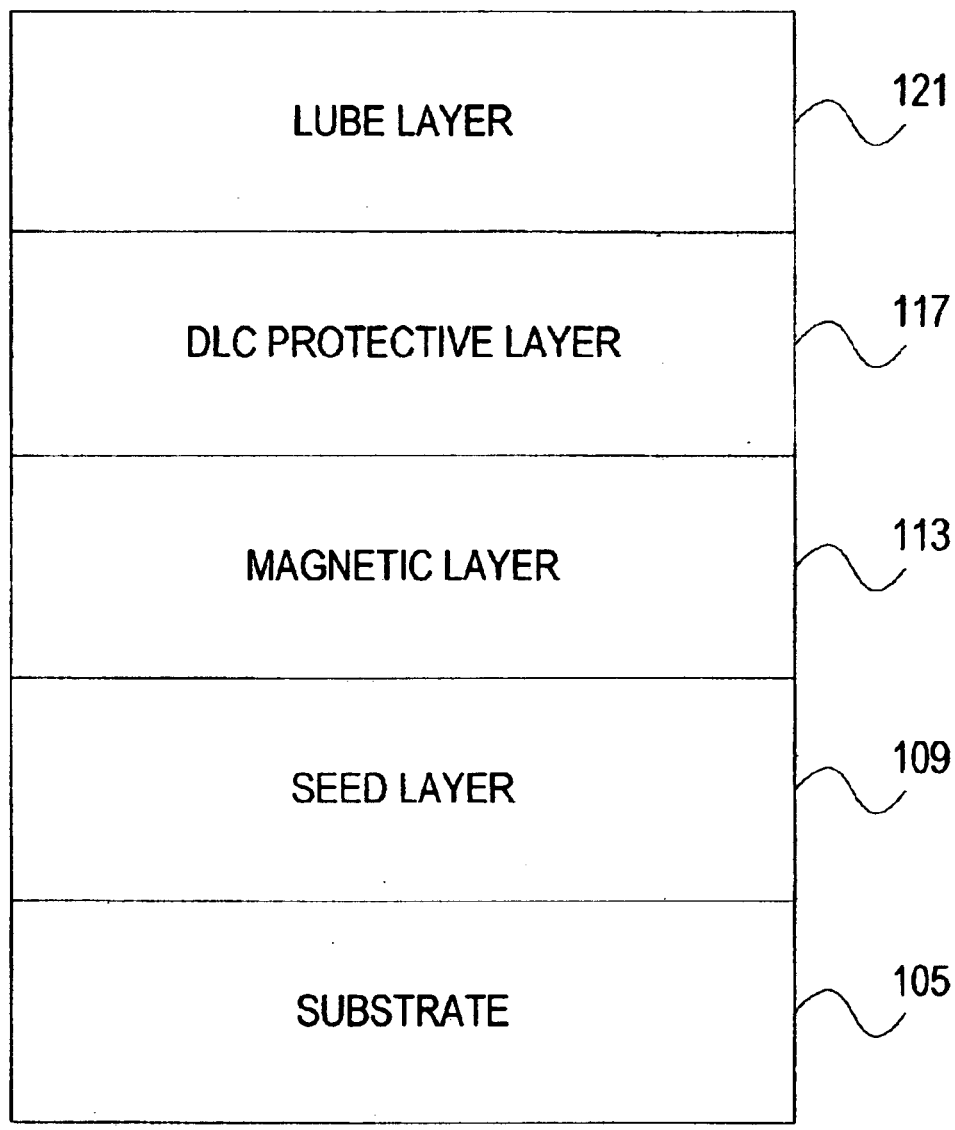
FIG. 1A is a block diagram showing a prior art conventional magnetic media structure with a lubricant layer.
Figure 1B:
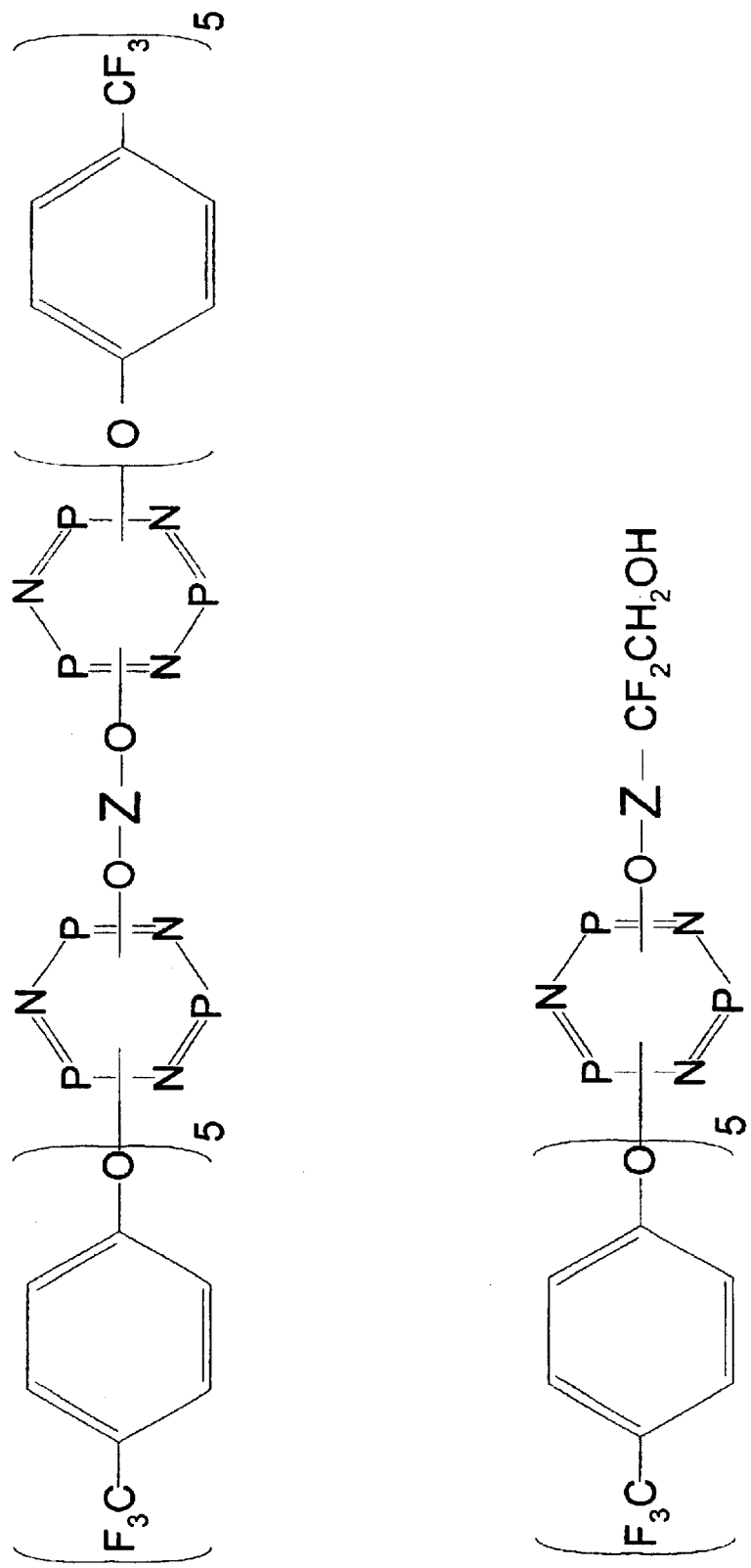
FIG. 1B shows the prior art conventional chemical structure of a Moresco lubricant.
Figure 1C:
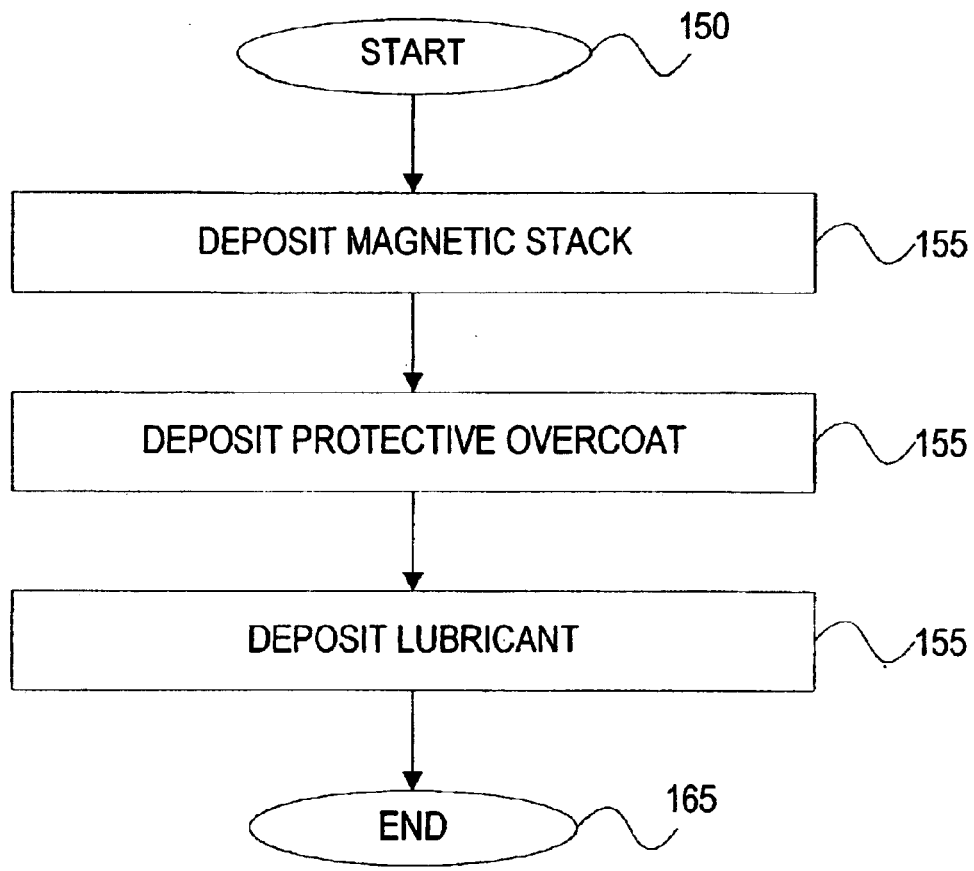
FIG. 1C is flowchart showing the prior art method of making a conventional magnetic media structure with lubricant.
Figure 2:
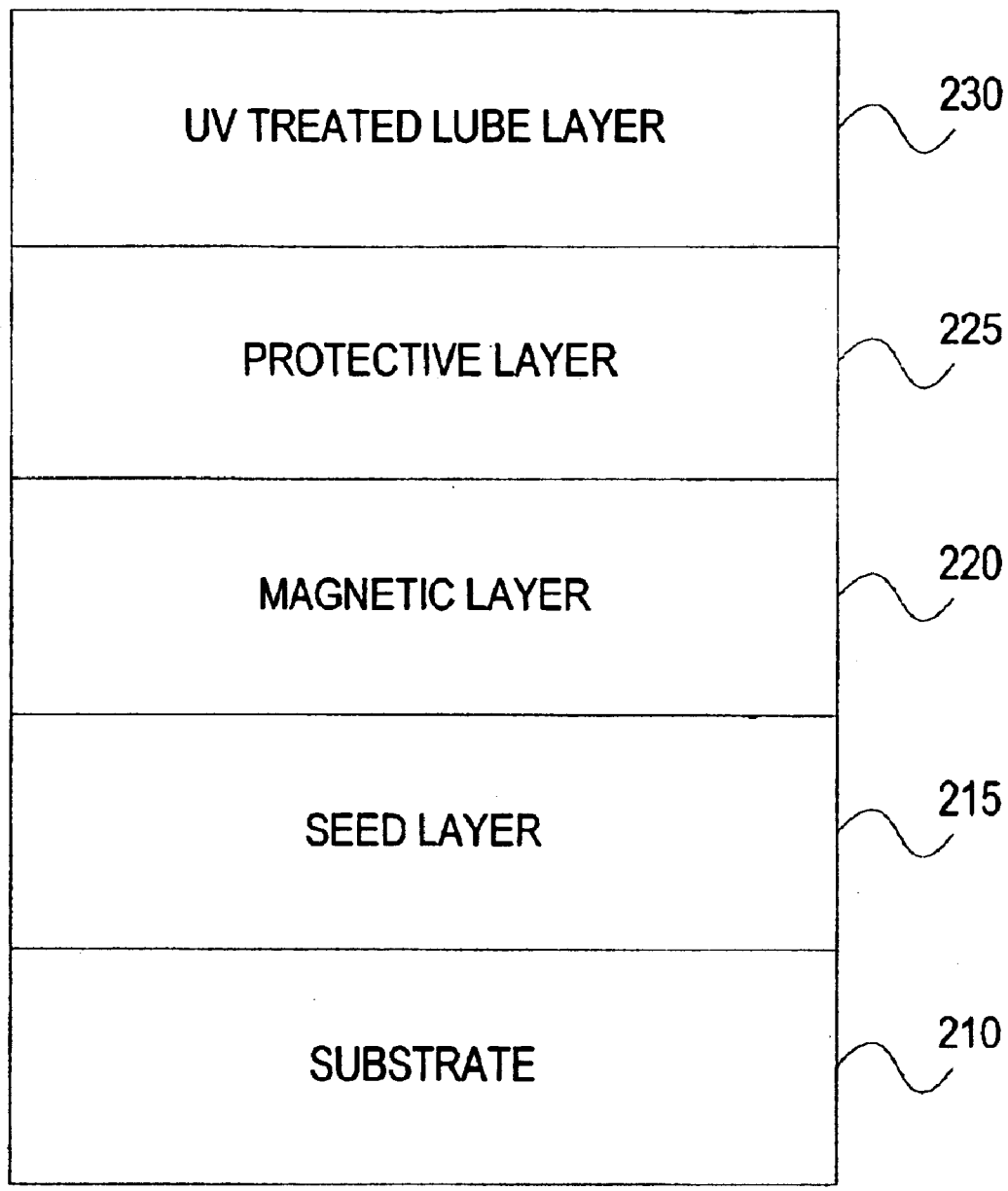
FIG. 2 is a block diagram showing a magnetic media structure with a lubricant layer that has been treated with UV.

FIG. 2 is a block diagram showing a UV treated lubrication layer 230 in a magnetic media 200 in accordance with one embodiment of the invention. Magnetic media 200 includes a substrate 210, a seed layer 215, a magnetic layer 220, a protective overcoat layer 225, and a UV treated lubrication layer 230. The substrate 210 is typically made of nickel-phosphorous plated aluminum or glass that has been textured. The seed layer 215, typically made of chromium, is a thin film that is deposited onto the substrate 210 creating an interface of intermixed substrate 210 layer molecules and seed layer 215 molecules between the two. The magnetic layer 220 is typically made of one or more magnetic alloys containing cobalt (Co), platinum (Pt) and chromium (Cr). Additionally, magnetic layer 220 can be a structure made of layers of magnetic alloys and spacers. Magnetic Layer 220, is a thin film or stack of thin films deposited on top of the seed layer 215.

Protective overcoat layer 225 is typically made of a carbon containing material such as diamond-like-carbon (DLC), nitrogenated carbon, or nitrogenated DLC. The protective overcoat 225 is typically deposited over magnetic stack 220 using conventional thin film deposition techniques including ion beam deposition (IBD), plasma enhanced chemical vapor deposition (PECVD), magnetron sputtering, radio frequency sputtering, or chemical vapor deposition (CVD). In one embodiment, the DLC protective layer 117 is prepared by ion beam deposition using a work gas is $C_2H_2$. The energy per C atom is 90 eV.

UV treated lubrication layer 230 includes hybrid lubricant films containing both perfluoropolyether (PFPE) moiety and cyclotriphosphazene moiety that has been exposed to UV light. Conventional lubrication processes such as dipping can be used to apply the lubricant. The UV light treatment is done by exposing the lubricant to UV light as is further discussed with reference to FIG. 3 below. The UV treatment enhances the lubricant bonding on overcoats containing carbon, reduces lubricant pickup and head smear, improves fly stiction, and improves CSS durability of thin film storage media. Hybrid lubricant that has not been treated with UV light has weak bonding to the carbon overcoat because of the lower hydroxyl end-group content. When lubricant film, which has not been treated with UV light, is in contact or near-contact with flying heads, lubricant molecules are more likely to be picked up. The UV light treatment process enhances the bonding of the hybrid lubricant on the carbon overcoat. The stronger bonding between the UV treated lubricant and the carbon overcoat reduces lubricant pick-up and head smear, as is further discussed with reference to FIGS. 4 and 5, below.

Magnetic media 200 with UV treated lubrication layer 230 can be used in a disc drive to give improved performance as is further discussed below with reference to FIGS. 4 and 5. A disc drive using a magnetic media 200 with UV treated lubrication layer 230 also includes a motor for spinning the magnetic media at many thousand revolutions per minute about its center of rotation, a transducer for magnetically reading and writing information on the magnetic media while the magnetic media is rotated about center axis. Those skilled in the art will recognize that other components needed to construct a disk drive such as the housing and Head-Stack-Assembly are also included and all are maintained within a housing. The UV treated lubrication layer 230 permits the transducer, which is mounted on a glide assembly, to glide over the rotating disk reliably for long periods of time.

Figure 3:
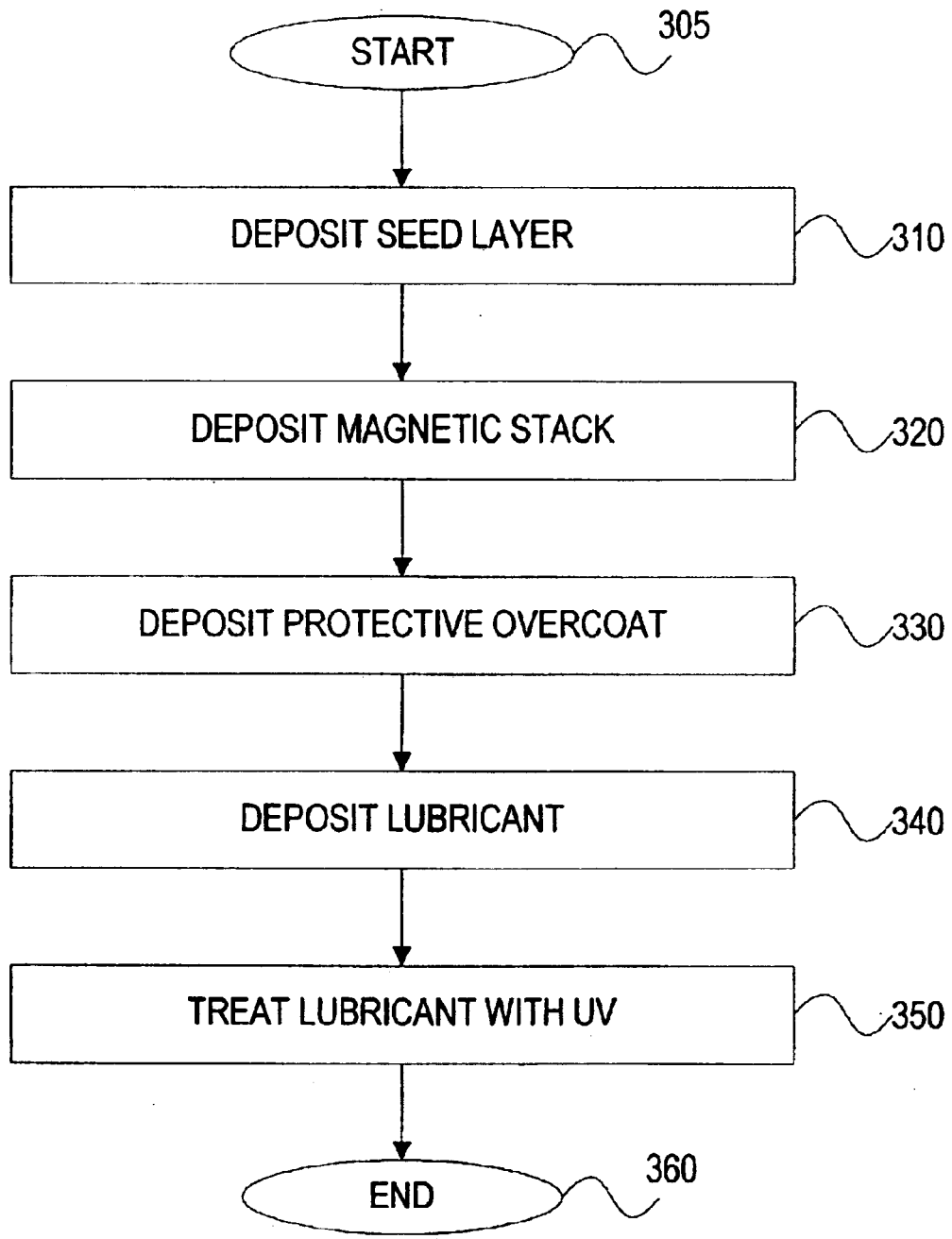
FIG. 3 is a flowchart showing the preferred method of lubricating a magnetic media and exposing the lubricant to ultraviolet light in accordance with the invention.

FIG. 3 is a flow chart showing the preferred steps used to make a magnetic media stack having a protective overcoat and lubrication layer that has been treated with ultraviolet (UV) light. The process begins with step 305 by preparing a substrate for thin film deposition. The preparation process of step 305 includes obtaining a disc substrate, texturing the substrate and cleaning the substrate. These processes are well known by those skilled in the art.

Next in step 310, the magnetic stack is deposited on the textured substrate. This process usually involves consecutively depositing a series of thin film layers onto the textured substrate. These consecutively deposited layers usually include underlayers, seed layers, spacer layers and a variety of magnetic layers. The magnetic stack provides the magnetic properties needed for magnetic recording including such properties as coercivity, remnant moment, and squareness. The deposition process can be done by various thin film deposition techniques including ion beam deposition (IBD), plasma enhanced chemical vapor deposition (PECVD), magnetron sputtering, radio frequency sputtering, or chemical vapor deposition (CVD).

Next in step 330 the protective overcoat layer 225 is deposited over the magnetic stack. The protective overcoat layer 225, which is typically diamond like carbon (DLC), can be deposited using a variety of thin film deposition techniques including ion beam deposition (IBD), plasma enhanced chemical vapor deposition (PECVD), magnetron sputtering, radio frequency sputtering, or chemical vapor deposition (CVD). In one embodiment, the DLC protective overcoat layer 225 is prepared by ion beam deposition using a work gas is $C_2H_2$. The energy per C atom is 90 eV.

Next in step 340 a lubricant layer is deposited over the protective overcoat. The lubricant layer can be applied using several processes including dipping the magnetic media having an overcoat into a tank of lubricant fluid or vapor lubing the disk. If the lubricant layer is applied with a dipping process wherein the magnetic media having a protective overcoat is dipped in a tank of lubricant fluid, then the magnetic media is typically taken out of vacuum and put into a tank. The thickness of the lubricant, which is left on the magnetic media, is controlled by the rate at which the lubricant is drained from the tank. The thickness can also be controlled by other means such as the rate at which the magnetic media is removed from the tank of lubricant fluid or the kind of additives in the lubricant. If the lubricant layer is applied with a vapor lubing process then the magnetic media with protective overcoat can be lubed under vacuum in the same processing tool as the previous thin films were deposited or it can be taken out of vacuum and loaded into a different vapor-lubing tool.

The lubricant layer can include hybrid lubricant films containing both perfluoropolyether (PFPE) moiety and cyclotriphosphazene moiety. For example Moresco lubricant, which was developed by Matsumura Oil research Company, is often used as a lubricant.

Next in step 350 the lubricant layer on the magnetic media is exposed UV light. Typically this includes exposing the magnetic media with lubricant to UV light for a fixed amount of time. The amount of time needed varies from lubricant to lubricant and is typically less than 60 seconds. The general pattern observed for different times of UV exposure is discussed in more detail with reference to FIG. 4 below. The UV light is generated using a low-pressure mercury discharge lamp having predominate wavelengths of 185 nm and 254 nm. About 15% of the light from the low-pressure mercury discharge lamp is 185 nm wavelength light and about 85% of the light is 254 nm wavelength light.

Finally in step 360, the magnetic media with UV treated lubricant is transferred to the next process step which can be a buff, or wipe, or test process.

Figure 4:
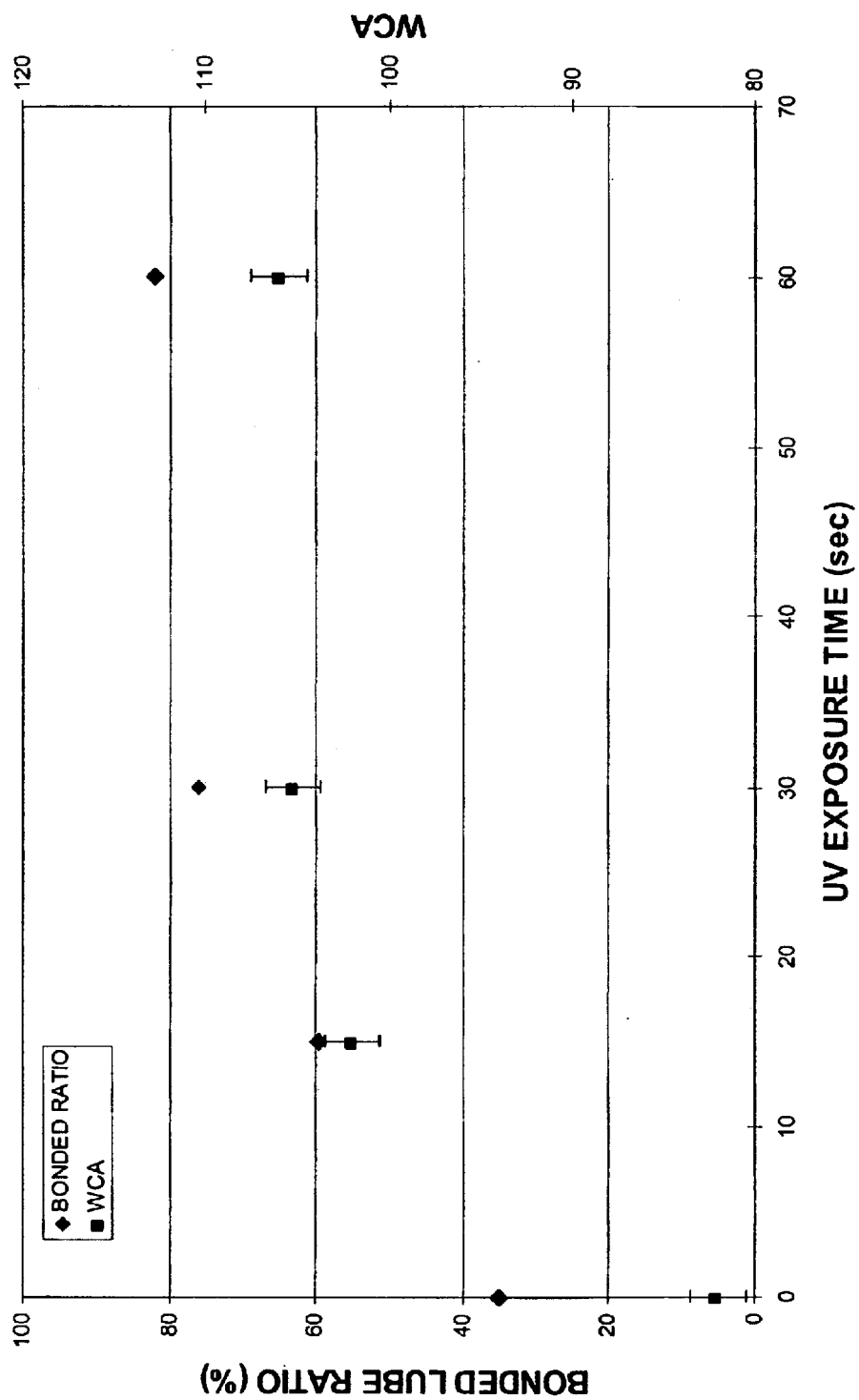
FIG. 4 shows the Bonded Lube Ratio (%) and the Water Contact Angle (WCA) as a function of UV exposure time (see)

FIG. 4 is a graph showing the bonded lube ratio (%) and water contact angle (WCA) for Moresco lubricant as a function of UV exposure time. The bonded lube ratio for Moresco lubricant without any exposure to UV light, except for background light, is about 35%. As the UV exposure time increases so does the bonded lube ratio. Exposing the lubricant layer to 15 seconds of UV light increases the bonded lube ratio to about 60%. Exposing the same lubricant layer to 30 seconds of UV light increases the bonded lube ratio to about 75% and exposing the lubricant layer to 60 seconds of UV light increases the bonded lube ratio to about 82%.

The WCA for Moresco lubricant without any exposure to UV light, except for background light, is about 82 degrees. As the UV light exposure time increases so does the WCA. Exposing the lubricant layer to 15 seconds of UV light increases the WCA to about 100 degrees. Exposing the same lubricant layer to 30 seconds of UV light increases the WCA to about 105 degrees and exposing the lubricant layer to 60 seconds of UV light increases the WCA to about 106 degrees. The data suggests that the WCA increases rapidly for UV exposure times less than 30 seconds and then increases slowly for higher UV light exposure times.

Figure 5:
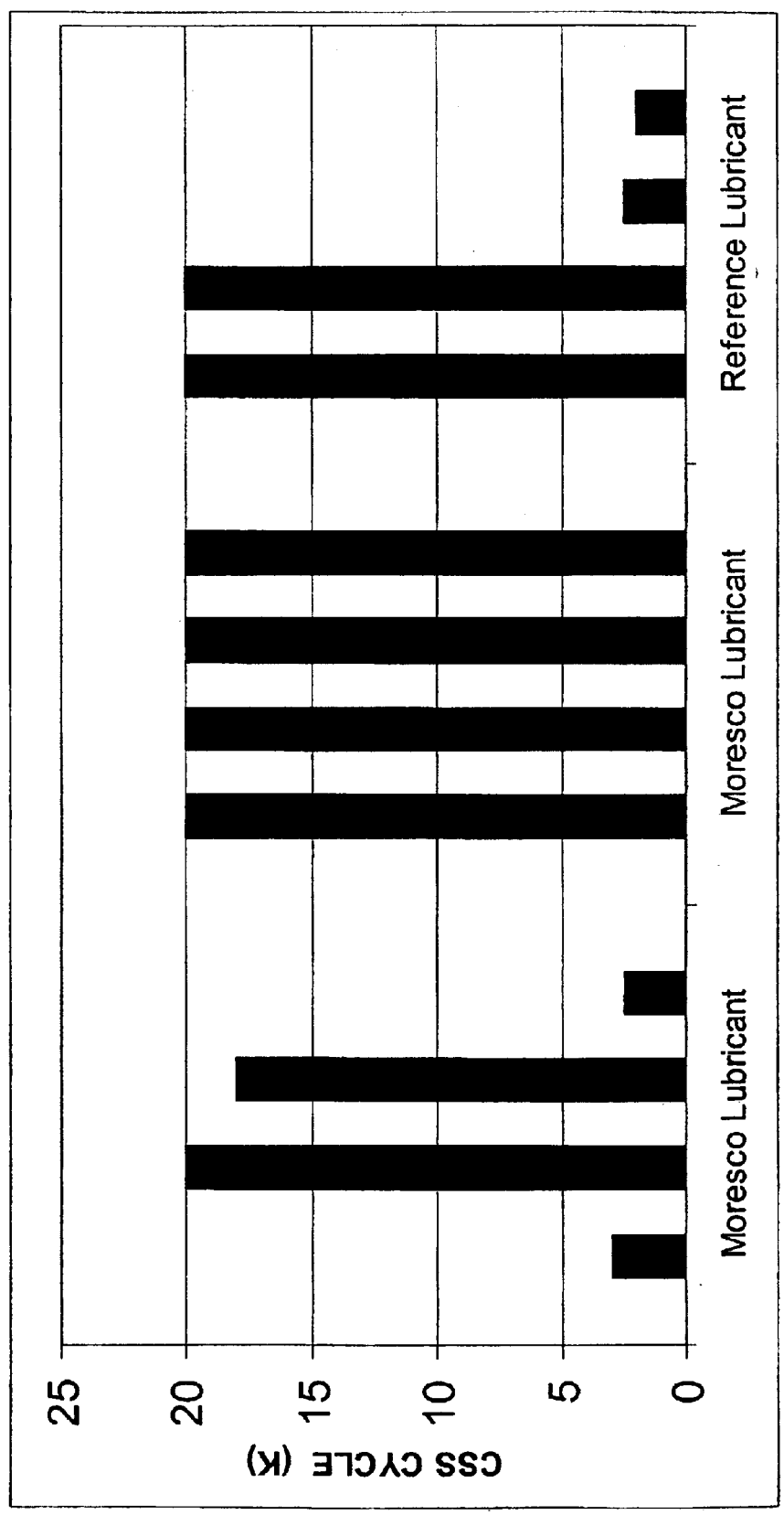
FIG. 5 is a bar graph showing and comparing the results of Contact Stop Start (CSS) testing for magnetic media lubricated with a reference lubricant, Moresco Lubricant that is exposed to UV light for 15 seconds, and Moresco Lubricant that is exposed to UV light for 30 seconds.

FIG. 5 is a graph showing contact-stop-start (CSS) test results for a reference lubricant, Moresco lubricant that has been exposed to 15 seconds of UV light, and Moresco lubricant that has been exposed to 30 seconds of UV light. CSS testing done on magnetic media having a reference lubricant layer, which is a Moresco lubricant without having been exposed to UV light, shows that only two magnetic media lasted the entire 20K cycle test and the other two failed at about 2.5K cycles. Similarly, CSS testing done on magnetic media having Moresco lubricant that has been exposed to UV light for 15 seconds shows that only two magnetic media lasted the entire 20K cycle test and the other two failed at about 4K cycles. However, CSS testing done on magnetic media having Moresco lubricant that has been exposed to UV light for 30 seconds shows that all four magnetic media lasted the entire 20K cycle test and none failed the CSS test. This remarkable result shows a 100% increase in magnetic media reliability as measured by CSS testing. The data suggests that disk reliability improves considerably by exposing the lubricant to UV light. Moreover the data suggests that the CSS performance improves as soon as there is some exposure to UV light and continues to improve with more exposure UV light, at least up until 30 seconds of UV light exposure.

UV treatment reduces fly stiction of the hybrid lubricant, from 12.6 g to 7.8 g after 30 sec of exposure. CSS durability at harsh environmental conditions is also improved significantly after disks are exposed to UV light.

The performance of magnetic media with UV treated lubricant improves with increasing time of exposure to UV light for to about 2 minutes. If the lubricant and carbon layer are exposed to UV light for more than 2 minutes, the carbon based protective layer as well as the lubricant begin to degrade. Therefore, the magnetic disk performance is maximized when the lubricant layer is exposed to as much UV light as possible, without degradation. For conventional lubricant layers of less than 100 Angstroms degradation occurs at approximately 2 minutes. Although 2 minutes may achieve the best magnetic media performance low exposure times also improve magnetic media performance as shown in FIGS. 4 and 5.

This large range of acceptable processing times makes this process adaptable to factory throughput concerns. In fact factory throughput can often be a factor in determining process to be feasible. This method of treating lubricants with UV light is adaptable for different throughputs because there is significant improvement in media reliability over a large time processing window. Although exposing lubricant to about 2 minutes of UV light can lead to best performance results, an exposure time of 1 minute gives nearly the same performance results and is better for throughput. UV exposure times of 30 to 40 seconds also significantly improve magnetic media performance and can be used to both significantly improve magnetic media performance while maintaining a reasonable throughput.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A method of lubricating a magnetic disk comprising, the steps of:

applying a lubricant layer to a magnetic media wherein said magnetic media further includes an overcoat comprising carbon and said lubricant layer further comprises hybrid lubricants containing both perfluoropolyether (PFPE) moiety and cyclotriphosphazene moiety; and exposing said lubricant layer to UV light.

2. The method of claim 1 wherein said lubricant layer is exposed to UV light for less than about 2 minutes.

3. The method of claim 1 wherein said lubricant layer is exposed to UV light for less than about 1 minute.

4. The method of claim 1 wherein said lubricant layer is exposed to UV light for about 20 seconds to about 40 seconds.

5. The method of claim 1 wherein said UV light comprises 185 nm wavelength light.

6. The method of claim 1 wherein said UV light comprises 254 nm wavelength light.

7. A method of manufacturing a magnetic disk, comprising the steps of:

depositing a seed layer onto a substrate;

depositing a magnetic stack over said seed layer;

depositing a protective overcoat over said magnetic stack;

depositing a lubricant over said protective overcoat; and exposing said lubricant layer to UV light.

* * * * *